Patented Aug. 23, 1938

2,128,199

UNITED STATES PATENT OFFICE 2,128,199

ANTIRACHITICALLY ACTIVE PRODUCT

Adolf Windaus, Gottingen, Germany, assignor to Winthrop Chemical Company, Inc., New York, N. Y., a corporation of New York No Drawing. Application March 19, 1937, Serial No. 131,779. In Germany December 9, 1933

2 Claims. (Cl. 260—397)

This invention relates to antirachitically activated 22,23-dihydroergosterol.

In my copending application for Letters Patent Serial No. 131,778 of even date, which, same as this application is a continuation in part application of Serial No. 755,840, filed Dec. 3, 1934, I have described a process of manufacturing 22,23-dihydroergosterol. According to my present invention this 22,23-dihydroergosterol, contrary to other dihydrogenated ergosterols, is converted into an antirachitically highly active transformation product by chemically active irradiation, particularly by ultra violet irradiation. This is the more surprising since 22,23-dihydroergosterol is the first transformation product of ergosterol and of sterol compounds at all which has been obtained by a chemical process other than an irradiation process, and which has the property of being a provitamin of an antirachitic vitamin D. My new discovery is further a proof that there are different products having antirachitic activity, for the new antirachitic vitamin obtained by irradiation of 22,23-dihydroergosterol not only differs from vitamin $D_2$ prepared by irradiation of ergosterol as to its chemical and physical properties, but also as to its antirachitic properties, since one rat unit of the vitamin prepared from 22,23-dihydroergosterol is about 30 times more active in the treatment of leg weakness of chicken than one rat unit of vitamin $D_2$ prepared from ergosterol. Accordingly, the antirachitic properties of irradiated 22,23-dihydroergosterol are more similar to the antirachitic properties of the natural vitamin D principle contained in cod liver oil since it is known that the natural vitamin D of cod liver oil is more active with chicken than vitamin $D_2$ obtained from ergosterol when equal rat units of the said products are administered to chicken. The antirachitically activated 22,23-dihydroergosterol is the first artificially prepared vitamin D which is clearly differentiated from the only artificial vitamin D hitherto prepared, that is vitamin $D_2$ prepared from ergosterol, since the known vitamin $D_1$ is merely an addition compound of vitamin $D_2$ and the inactive lumisterol.

In accordance with the present invention 22,23-dihydroergosterol or its esters are antirachitically activated by ultra violet irradiation in the usual manner, for instance, by means of a quartz mercury vapor lamp or a magnesium spark. The said substances are preferably dissolved prior to the irradiation in a suitable organic solvent, such as ether or liquid hydrocarbons, for instance, benzine, ligroin, n-pentane, and the like. The esters of the 22,23-dihydroergosterol are saponified prior to the irradiation or after the irradiation. As esters of 22,23-dihydroergosterol first of all those of the lower fatty acids, preferably the acetic acid ester, but also, for instance, benzoic acid ester come into consideration.

The 22,23-dihydroergosterol is transformed by the irradiation into a colorless resin which is insoluble in water but dissolves in the usual organic solvents, such as alcohols, acetone and liquid hydrocarbons. The antirachitic activity of the transformation product amounts to one international vitamin D rat unit in about 0.5–1 $\gamma$. Experiments to obtain from the resinous transformation product a crystalline substance have not been successful when using the usual recrystallization methods. But I have found that considerable purification of the product is obtained by transforming the irradiation product into its ester, preferably into its meta-dinitrobenzoic acid ester. The said ester has been obtained in a crystalline form. By saponification thereof and recrystallization of the saponification product the antirachitically active transformation product of 22,23-dihydroergosterol has been obtained in a crystalline form. Advantageously prior to the esterification step unchanged 22,23-dihydroergosterol which is still present in the irradiation product is removed by the addition of an alcoholic solution of digitonin. Only the unchanged 22,23-dihydroergosterol forms a difficultly soluble addition compound with digitonin, so that the more soluble transformation product can readily be separated from unchanged starting material. Furthermore, it may be advantageous to subject the antirachitically active transformation product to a further purification step by treatment of the irradiation product with an ethylene-cis-dicarboxylic acid anhydride, such as maleic acid anhydride and citraconic acid anhydride. On prolonged treatment, for instance, with citraconic acid anhydride at normal temperature only antirachitically inactive by-products react with the citraconic acid anhydride. When treating the reaction mixture thus obtainable with saponifying agents, for instance, with alcoholic alkali lyes, the active product may be separated from the salts of the addition compounds thus formed by extraction with organic solvents, such as ether, petroleum ether or mixtures thereof. On esterification of the active substance thus obtainable by means of meta-dinitrobenzoylchloride yellowish needles of the meta-dinitrobenzoic acid ester of the antirachitically active irradiation product of 22,23-dihydroergosterol are obtained. They melt at 135–136° C. and have a specific rotary power $$[\alpha]_D^{18} = +94.5°$$

in acetone solution. The ester has the formula: $C_{35}H_{48}N_2O_6$. This ester yields on saponification with dilute alcoholic alkali lye a saponification product which on recrystallization is obtained in leaflet-like crystals melting at 107–108° C. Their absorption spectrum has a characteristic maximum at 265 m$\mu$ which is similar to that of vitamin $D_2$. The specific rotary power of the crystalline product is $$[\alpha]_D^{18} = +89.3°$$

According to analysis the crystalline product has the formula $C_{28}H_{46}O$. One international unit of antirachitic activity is contained in less than 0.1 $\gamma$. When irradiating 22,23-dihydroergosteryl esters, for instance, 22,23-dihydroergosteryl acetate, esters of the antirachitically active transformation product of 22,23-dihydroergosterol are obtained which may be saponified and purified as indicated above.

The invention is further illustrated by the following example:

Example.—An about 1% solution of 22,23-dihydroergosterol in n-heptane is irradiated in a quartz vessel with the light of the magnesium spark while excluding oxygen. At a distance of about 5 cm. the irradiation is continued during about 4 hours. After the solvent has been removed under reduced pressure, an amorphous colorless resin remains. Its antirachitic activity amounts to one international vitamin D rat unit in 0.5 to 1 $\gamma$.

Instead of the magnesium spark the usual quartz mercury vapor lamps may be used as the sources of ultra violet light. Instead of n-heptane other solvents, for instance, benzine and ligroin, benzene, the lower alcohols or mixtures thereof may be used.

The antirachitically active resinous product is transformed into a crystalline product of increased activity in the following manner:

7 grams of the resinous irradiation product are treated with 100 ccs. of methanol which is free from air at 35–40° C. Then an alcoholic solution of 10 grams of digitonin is added. The mixture is evaporated to dryness under reduced pressure. The residue is treated with about 150 ccs. of low boiling petroleum ether, thoroughly shaken therewith and left standing at ordinary temperature for 12 hours. 22,23-dihydroergosterol-digitonide and excess digitonin remain undissolved; they are filtered and washed several times with petroleum ether. The filtrate is evaporated to about 10 ccs. and treated with a solution of 3 ccs. of citraconic acid anhydride in absolute peroxide-free ether; just such a quantity of ether is used for this purpose that the citraconic acid anhydride is clearly dissolved in the ether-petroleum ether mixture. The solution is then left standing for 5 days with careful exclusion of air. After that time the 22,23-dihydro-tachysterol has completely reacted with the citraconic acid anhydride. The solution is then evaporated to dryness at 35–40° C. under reduced pressure and the residue dissolved in about 80 ccs. of methylalcoholic potash lye. For complete saponification the solution is left standing for 12 hours. It is then treated with the double volume of boiled water and several times extracted with a mixture of petroleum ether-ether. The petroleum ether-ether solution is shaken with air-free water, dried with sodium sulfate, filtered and evaporated. A yellowish colored oil remains as the residue which after thoroughly drying is dissolved in a small quantity of pyridine. The mixture is then treated with a solution of 3 grams of meta-dinitrobenzoyl-chloride in a small quantity of pyridine. After 12 hours' standing the weakly brown colored solution is poured into water which is saturated with sodium bicarbonate. The oily product precipitating therefrom is taken up in ether. The ethereal solution is several times shaken with water, dried over sodium sulfate and evaporated to dryness under reduced pressure. A brown colored oil remains which is repeatedly extracted with hot methanol. The methylalcoholic extracts are united and evaporated in an exsiccator which is filled with carbon dioxide. The solution is poured off from the oil first separated. The process is repeated several times until finally thin, needle-like crystals separate from the methylalcoholic solution. After repeated redissolving from acetone-methanol the weakly yellow colored needles melt at 135–136° C. According to analysis they have the formula: $C_{35}H_{48}N_2O_6$. The specific rotary power is $$[\alpha]_D^{18} = +94.5°$$

A solution of 1.5 g. of the meta-dinitrobenzoate in 30 ccs. of 5% methylalcoholic potash solution is boiled for about 20 minutes on the waterbath in a current of nitrogen. The potassium salt of the meta-dinitrobenzoic acid precipitating is filtered and the filtrate carefully mixed with water. From the solution thin, leaflet-like crystals separate after short standing which after filtering are washed with aqueous methanol. They are repeatedly redissolved from acetone with the addition of a small quantity of water. Acetone containing water is used as the washing liquid. The white crystals melt at 107–108° C. Their absorption spectrum, same as that of vitamin $D_2$ has a characteristic maximum at 265 m$\mu$; the absorption coefficient is likewise the same as that of vitamin $D_2$. The analysis has the formula: $C_{28}H_{46}O$. The specific rotary power is $$[\alpha]_D^{18} = +89.3°$$

I claim:
1. The antirachitically active product obtained by ultra violet irradiation of 22,23-dihydroergosterol.
2. The crystalline antirachitically active product obtained by ultra violet irradiation of 22,23-dihydroergosterol, which product has the formula $C_{28}H_{46}O$, which melts at 107–108° C., has a rotary power

$$[\alpha]_D^{18} = +89.3°$$

in acetone solution and an absorption maximum at 265 m$\mu$, one "international unit" of antirachitic activity being contained in less than 0.1 $\gamma$.

ADOLF WINDAUS.